No. 743,087. PATENTED NOV. 3, 1903.
J. N. KAILOR & M. T. REEVES.
SCREEN SHOE FOR SEPARATORS.
APPLICATION FILED JUNE 15, 1903.
NO MODEL.
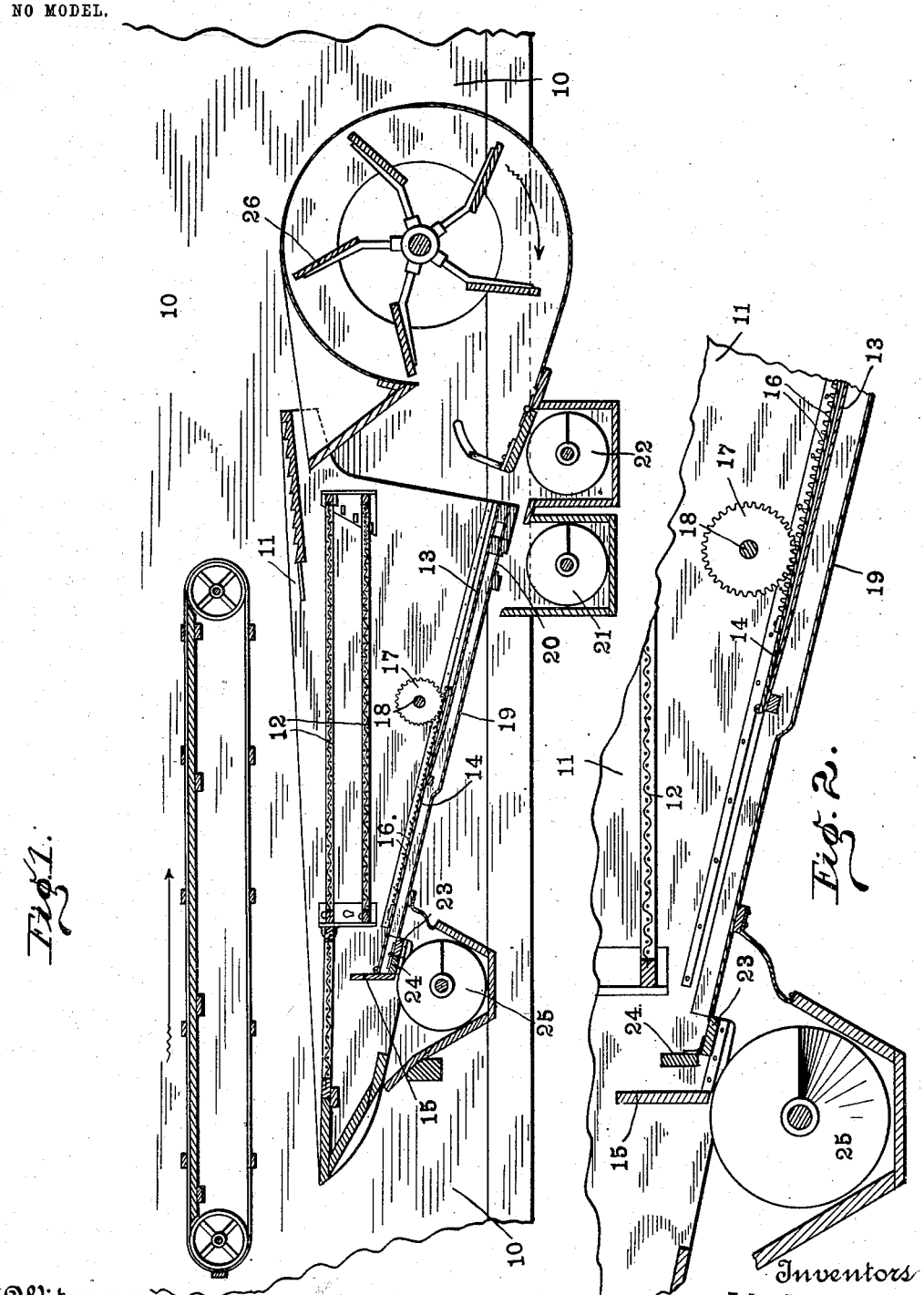
Witnesses
Frank A. Fahle
J. A. Walsh
Inventors
John N. Kailor
Marshal T. Reeves
By Bradford & Hood
Attorneys No. 743,087. Patented November 3, 1903.

UNITED STATES PATENT OFFICE.

JOHN N. KAILOR AND MARSHAL T. REEVES, OF COLUMBUS, INDIANA, ASSIGNORS TO REEVES & COMPANY, OF COLUMBUS, INDIANA, A CORPORATION OF INDIANA.

SCREEN-SHOE FOR SEPARATORS.

SPECIFICATION forming part of Letters Patent No. 743,087, dated November 3, 1903.

Application filed June 15, 1903. Serial No. 161,518. (No model.)

*To all whom it may concern:*

Be it known that we, JOHN N. KAILOR and MARSHAL T. REEVES, citizens of the United States, residing at Columbus, in the county of Bartholomew and State of Indiana, have invented certain new and useful Improvements in Screen-Shoes for Separators, of which the following is a specification.

The object of our invention is to provide means in or in connection with the screen-shoe of a separator by means of which the separated grain may be divided into different grades, the device being especially designed for use in rice-separators in order to divide the rice into different grades according to weight.

The accompanying drawings illustrate our invention.

Figure 1 is a central vertical section of our improved screen-shoe and adjacent parts, and Fig. 2 is an enlarged detail of a portion of the parts shown in Fig. 1.

In the drawings, 10 indicates the separator-casing, and 11 the vibratory screen-shoe, having the usual screens 12 therein. Arranged beneath screens 12 is an inclined floor consisting of a fixed forward portion 13 and a sliding rear portion 14, which lies upon portion 13 and is adapted to bridge the gap between the rear end of portion 13 and the divider-board 15. The movable floor 14 is provided with a rack 16, into which meshes an operating-gear 17, the shaft 18 of which is carried to the outside of casing 10 and provided with any suitable means by which it may be operated. Arranged beneath the floors 13 14 is a fixed floor 19, which at its forward end has an opening 20 above the delivery-screw 21. The forward end of floor portion 13 lies above a feed-screw 22, arranged alongside of screw 21. Floor 19 extends rearward to a point a short distance from divider-board 15, and the space between said floor and the divider-board is bridged by two removable bridge-slats 23 and 24, which are hinged together for a purpose which will appear. Lying beneath the opening bridged by slats 23 and 24 is a third feed-screw 25. The usual blast-fan 26 is provided for furnishing the necessary blast to the shoe.

In operation the blast from fan 26 serves to carry the lighter grain toward the rear, the heavier grain falling upon bottom portions 13 and 14 and sliding forward to screw 22, and if the bottom portion 14 is extended to divider-board 15 all of the grain except the tailings pass to screw 22, while the tailings pass over divider-board 15 and drop into the box of screw 25. If the operator desires to separate his grain into two grades one of which shall be only the very heaviest and best grain, bottom portion 14 may be retracted to the point shown in Fig. 2, whereupon all but the heaviest of the grain will drop upon the rear end of the fixed floor 19 and slide forward through opening 20 to screw 21, while the heaviest grain will drop upon the retracted bottom 14 and pass to screw 22. By adjusting bottom 14 toward or from the divider-board 15 the grain may be very accurately divided into two classes. If, on the other hand, it is desired that some of the lighter grain shall pass into tailings, slat 24 will be turned up to the position shown in Fig. 2, whereupon the lighter grain passes to the screw 25. If the rear end of bottom portion 14 stands even with slat 24 in its raised position, all of the grain which does not pass to screw 25 will pass forward to screw 22; but by placing the rear end of bottom at any point forward of slat 24 three grades of grain may be had.

We claim as our invention—

1. In a screen-shoe for separators, the combination, with the shoe and screens thereof, of a closed bottom arranged beneath the screens to receive material therefrom and consisting in part of an adjustable section, means for adjusting said section longitudinally of the screens, and grain-receiving means arranged at each end of the bottom, for the purpose set forth.

2. In a screen-shoe for separators, the combination, with the shoe and screens thereof, of a fixed bottom section, an adjustable bottom section, means for adjusting said bottom section longitudinally of the screens, and a fixed bottom section beneath said two sections, the said several bottoms being arranged beneath the screens to receive material therefrom, for the purpose set forth.

3. In a screen-shoe for separators, the combination with a screw and the screens thereof, of a fixed bottom section 19, an adjustable bridge at the rear end of said bottom, and an adjustable bottom section above the first-mentioned bottom and longitudinally adjustable with relation to the screens.

4. In a screen-shoe for separators, the combination, with a shoe and screens thereof, of bottom 19, bridge-slats 23, 24, bottom 13, adjustable bottom 14, and means for adjusting said bottom longitudinally of the screens, substantially as and for the purpose set forth.

In witness whereof we have hereunto set our hands and seals at Columbus, Indiana, this 10th day of June, A. D. 1903.

JOHN N. KAILOR. [L. S.]
MARSHAL T. REEVES. [L. S.]

Witnesses:
HELEN J. HALBERT,
BERTHA L. HARRISON.